United States Patent [19]
Takei et al.

[11] Patent Number: 5,473,445
[45] Date of Patent: Dec. 5, 1995

[54] IMAGE SCANNER AND IMAGE SCANNING METHOD

[75] Inventors: Toru Takei, Katsuta; Kozo Nakamura, Hitachiota; Keisuke Nakashima, Hitachi; Kagehiro Yamamoto, Katsuta; Yasuyuki Kozima, Hitachi, all of Japan

[73] Assignee: Hitachi, Ltd., Tokyo, Japan

[21] Appl. No.: 77,115

[22] Filed: Jun. 16, 1993

[30] Foreign Application Priority Data

Jun. 17, 1992 [JP] Japan .................................. 4-157765

[51] Int. Cl.$^6$ .............................. H04N 1/04; H04N 1/36
[52] U.S. Cl. ................. 358/474; 358/409; 358/412; 358/496
[58] Field of Search ....................... 358/409, 410, 358/412, 413, 418, 474, 486, 496, 498

[56] References Cited

U.S. PATENT DOCUMENTS

| | | | |
|---|---|---|---|
| 4,663,672 | 5/1987 | Sakamoto | 358/409 |
| 4,992,888 | 2/1991 | Nagashima | 358/410 |
| 5,278,675 | 1/1994 | Kamiyama | 358/412 |

*Primary Examiner*—Edward L. Coles, Sr.
*Assistant Examiner*—Thomas D. Lee
*Attorney, Agent, or Firm*—Antonelli, Terry, Stout & Kraus

[57] ABSTRACT

In a high-speed image scanner, a driving method is proposed which needs no timing adjustment between the sensor driving pulse and the motor drive pulse required when the motor shifts from an accelerated state to a constant-speed state. The period of the sensor driving pulse is selected to be equal to or 1/N (N=integer) of that of the motor drive pulse at the time of constant-speed operation, and the phases of the sensor driving pulse and motor drive pulse are controlled independently of each other. Thus, even though the sensor driving pulse and the motor drive pulse are out of good timing, each line of the image can be surely read.

8 Claims, 15 Drawing Sheets

IMAGE SCANNER AND IMAGE SCANNING METHOD

BACKGROUND OF THE INVENTION

This invention relates to an image scanner or the like for reading a manuscript by photoelectric conversion in a facsimile, digital copying machine and so on.

In order to read a manuscript in an image scanner, the manuscript is moved in the sub-scanning direction relative to an image sensor, or the image sensor, or reversely the sensor is moved in the sub-scanning direction relative to the manuscript. In this case, a step motor is often used for the movement of the sensor or the manuscript. This step motor is first accelerated from the still state to a constant rotation speed, and then kept at the constant speed. When the motor is switched from the acceleration to the constant speed, however, the timing for reading is not matched with that for driving the motor. Various methods have been considered to cope with this problem. One example thereof is proposed in Japanese Patent Laid-open Gazette No. 3-201865. In addition, to easily change the reading magnification, a method for the asynchronism between the read pulse and the drive pulse has been proposed in Japanese Patent Laid-open Gazette No. 62-178063.

These conventional methods, however, have the following drawbacks in reading the manuscript at a high speed.

FIG. 2 is a timing chart to which reference is made in explaining the problems. The motor drive pulse generated at each line drives (i.e. increment) of the motor for moving the manuscript or image sensor. In FIG. 2, T is the exposure time for the optimum amount of light to the sensor. The sensor driving pulse used for the sensor to read the manuscript is changed in pulse width as a1 and a2 in each line in order to be always synchronized with the motor drive pulse. Also, the sensor driving pulse width a1, a2 must be smaller than T, or T>a1, a2. If this pulse width is longer than the sensor driving pulse period T, the sensor is saturated, thus deteriorating the picture quality, and the charge generated in each picture element by photoelectric conversion leaks into a adjacent picture elements, making the correct reading impossible. In addition, this charge leaking effect remains in the next several lines.

When a manuscript of A4 size placed to be vertically long is read at a high speed of two seconds or below, the exposure time T approaches the data transfer time D which is taken for image data read one line before to be transferred from the sensor. Therefore, since D is larger than a1, a2, or D>a1, a2, part of data cannot be taken out, or transferred from the sensor in the exposure time a1, a2, and thus partially read data cannot be used as correct data. In addition, the data remaining not taken out is added to the data read in the exposure time a1, a2. The data read in the exposure time a1, a2 is not used from the first, but when it is added with the data obtained one line before, the charge leaks into the adjacent picture elements of the sensor and has an adverse effect in the next several lines. Since the speed at which data is read from the sensor depends on the transfer ability of the sensor itself, the reading time, or the data transfer time D cannot be decreased.

When a large amount of manuscript such as a Patent Gazette or a long manuscript of recorded computer paper is transmitted to the recipient by facsimile, the manuscript cannot be all read at a constant speed because of transmission conditions and memory capacity. Therefore, the reading speed is decreased to a low value or zero or increased. Thus, it is necessary to read data at the decreased or increased speed. However, as illustrated in FIG. 2, the data that can be read during the acceleration is only the first one line of the three lines, and thus the picture quality is remarkably degraded.

Since it is difficult to change the exposure time as a1, a2 during the high-speed reading time as described above, the exposure time must be kept constant. Thus, the motor speed immediately before the constant speed is only one half of the constant speed because of the motor drive pulse. In order to satisfy this acceleration and deceleration conditions, a large-torque motor must be used, resulting in high cost and large size.

Moreover, in an image reader such as a copying machine, the magnification of the image can be changed by changing the reading speed. In this method, however, since the reading speed is changed for the magnification, the control for the drive motor and so on becomes complicated.

As described above, the high-speed reading of a manuscript encounters with various different problems.

SUMMARY OF THE INVENTION

Accordingly, it is an object of the invention to provide an image scanner and image scanning method capable of reading at a high speed of two seconds or below a manuscript of A4 size that is placed to be vertically long, and capable of simply and inexpensively realizing the timing adjustment between the motor drive pulse and the sensor driving pulse generated when the drive motor is shifted from the speed changing state to the constant speed state.

In order to achieve the above object, the sensor driving pulse period is kept constant and the motor drive pulse period is changed. In addition, the sensor driving pulse and the motor drive pulse are not controlled to be in phase as in the prior art, but controlled in their phases independently of each other.

When this invention is applied to a copying machine or the like, the same control as described above is used for the reading speed, and the read data is processed by software so that the magnification is changed.

Since the sensor driving pulse and the motor drive pulse are not controlled to be in phase, the sensor driving pulse and the motor drive pulse are not synchronized with each other not only during the speed changing time but also during the constant speed time. However, since the periods of both pulses are equal, data of one line can be read from the sensor during the constant speed time and thus the picture quality is not deteriorated.

DESCRIPTION OF TEE PREFERRED EMBODIMENTS

Figure 3:
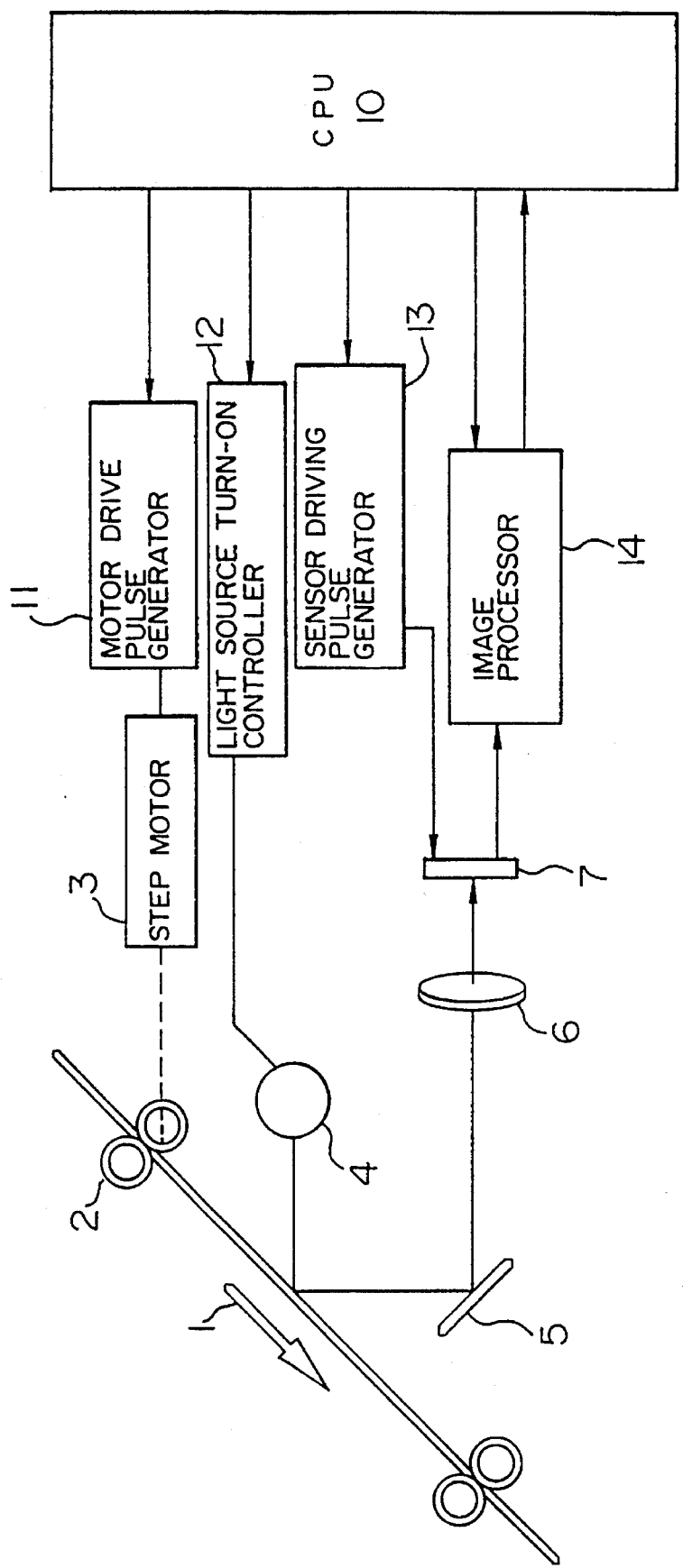
FIG. 3 is a block diagram of an embodiment of an image scanner of the invention.

An embodiment of an image scanner of the invention will be mentioned with reference to FIG. 3.

Referring to FIG. 3, a CPU 10 for controlling the whole system is connected with a motor drive pulse generator 11, a sensor driving pulse generator 13 and an image processor 14.

The pulse signal generated from the motor drive pulse generator 11 controls a step motor 3, and this step motor drives a manuscript carrying roller 2, thereby carrying a manuscript 1 from an automatic manuscript supply mechanism not shown to a reading stage.

In FIG. 3, the manuscript 1 is moved relative to a reduction optical system which includes a light source 4 through an image sensor 7 of a CCD. If, on the contrary to the illustration, the manuscript 1 may be fixed relative to the moving reduction optical system, or if this image scanner is used as the so-called book reading type image scanner, the reduction optical system can be moved by the motor. The light source 4 such as a fluorescent lamp is lit by a light source turn-on controller 12, illuminating the manuscript 1. The reflected light from the manuscript 1 is further reflected by the mirror 5 into the lens 6, which then forms an image on the image sensor 7. The image sensor 7 is supplied with a control signal from the sensor driving pulse generator 13, and thereby controlled to convert the optical image into an electrical signal. The electric signal is supplied to and converted by the image processor 14 into a binary signal. The sensor driving pulse generator 13, the motor drive pulse generator 11, the light source turn-on controller 12 and the image processor 14 are all operated on the basis of the commands from the CPU 10.

Particularly, the commands for the periods and phases of the pulses from the sensor driving pulse generator 13 and motor drive pulse generator 11 are also generated from the CPU 10.

In this image scanner, the period of the sensor driving pulse is substantially constant. In addition, when the motor speed is increasing, the period and phase of the sensor driving pulse are made different from those of the motor drive pulse. When the motor speed is constant, the period of the motor drive pulse is made substantially equal to that of the sensor driving pulse, but the phases thereof are shifted from each other. Thus, an image scanner capable of high-speed reading without deteriorating the picture quality can be realized by slightly modifying a conventional arrangement.

Figure 4:
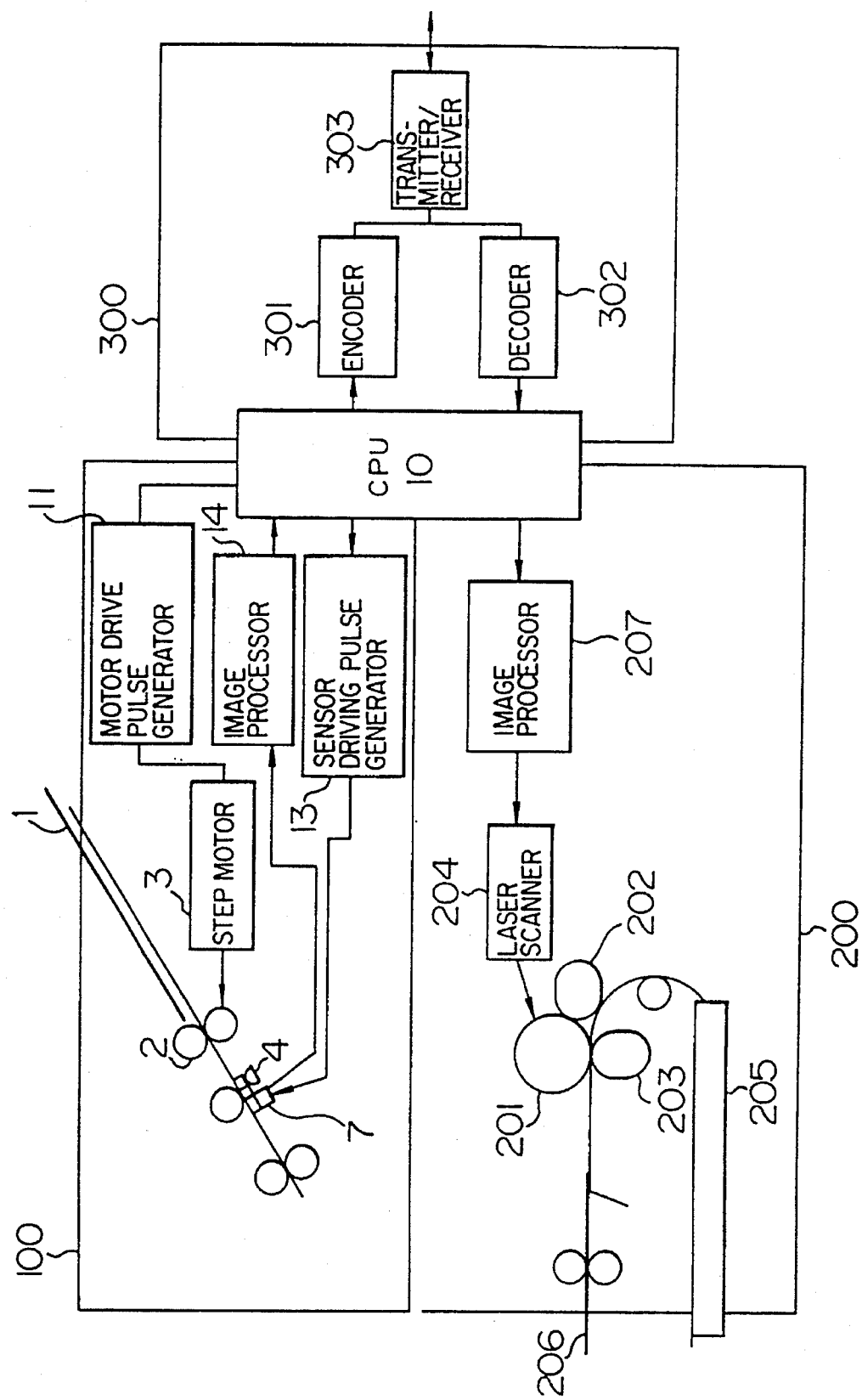
FIG. 4 is a block diagram of a facsimile system to which this invention is applied.

FIG. 4 is a schematic block diagram of a facsimile system constructed by the combination of the above image scanner, 100, a recorder 200 and a communication apparatus 300.

The recorder 200 is a laser printer which has a photosensor drum 201, a developing device 202, a transfer device 203, a laser scanner 204 and a paper supply cassette 205. The communication apparatus 300 has a communication transmitter/receiver 303, an encoder 301 for coding the image data which is to be transmitted through the communication transmitter/receiver 303, and a decoder 302 for decoding the coded data that is received through the communication transmitter/receiver 303. These elements are controlled by the CPU 10.

In the image scanner 100 described with reference to FIG. 3, the contact image sensor 7 made of amorphous silicon or the like is used in place of the reduction optical system as shown in FIG. 4. The contact image sensor 7 can be made in intimate contact with the manuscript 1. In addition, a small-sized reader can be realized by using a small linear light source of LED or the like for the light source 4.

The image data produced from the image scanner 100 is supplied through the CPU 10 to the encoder 301, where it is compressed into a coded signal. This signal is transmitted from the communication transmitter/receiver 303. The coded signal transmitted from another facsimile system is received by the communication transmitter/receiver 303 and supplied to the decoder 302, where it is decoded into the image signal. This image signal is supplied through the CPU 10 to the image processor 207 of the recorder 200. The processed signal from the processor is supplied to the laser scanner 204, and thus a received manuscript 206 can be obtained by a well known method. As will be described later, the image data read by the image scanner 100 can be supplied, not through the communication apparatus 300 but directly, to the recorder 200, thus this system being used as a copying machine. Since this facsimile system has the image scanner 100 shown in FIG. 3, the manuscript reading time which was long in the conventional facsimile system can be decreased to one through two seconds per sheet of, for example, A4 size placed to be vertically long, and no error is caused in reading.

The operation of the image scanner of the invention as a main part of the facsimile system will be described with reference to FIG. 1.

Figure 1:
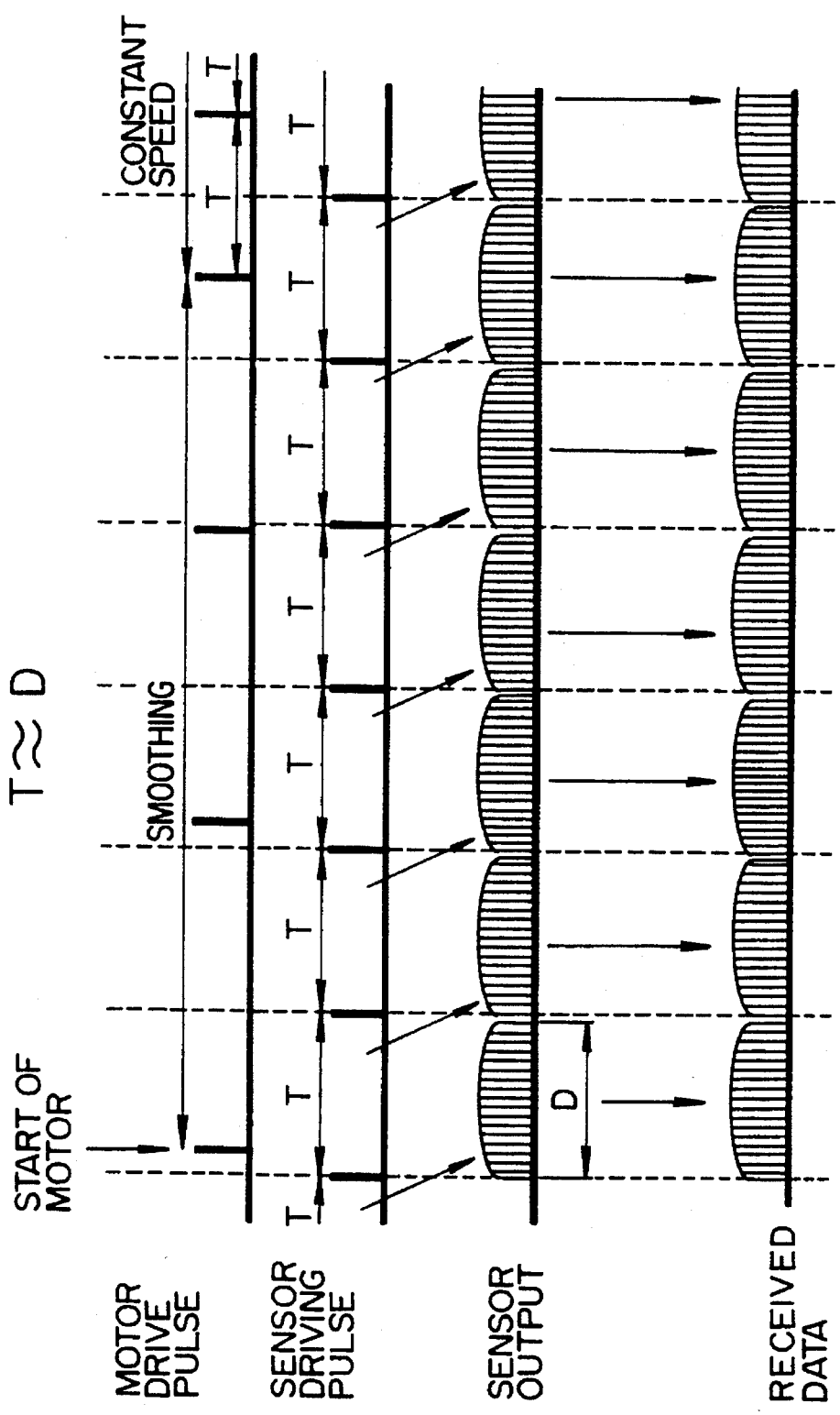
FIG. 1 is a timing chart for the sequence of reading when the motor speed is increased and reaches a constant value according to this invention.
Figure 2:
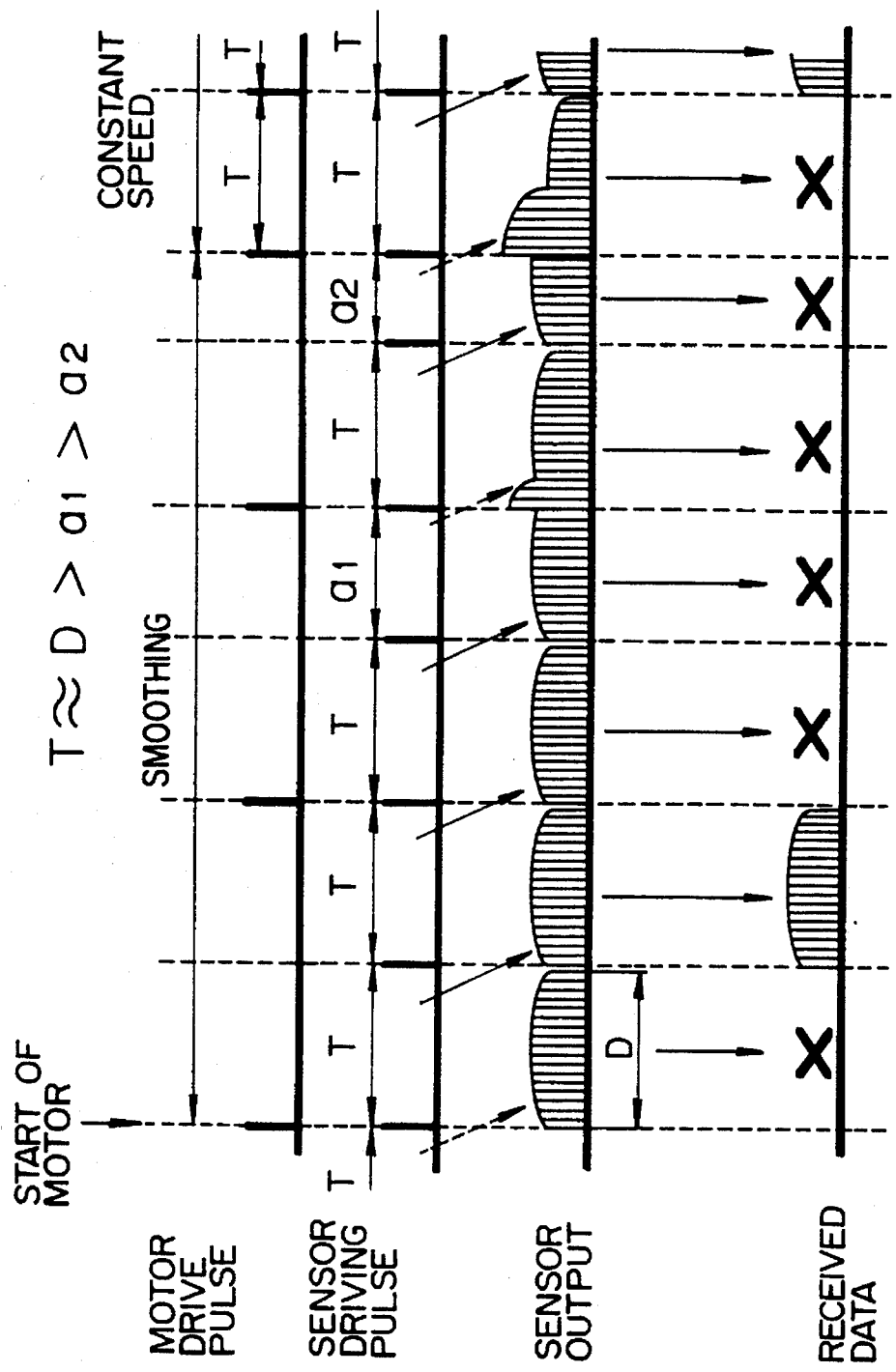
FIG. 2 is a timing chart for the sequence of reading when the motor speed is increased and reaches a constant value in the prior art.

FIG. 1 is a timing chart for the read control sequence in the period in which the rotation speed of the step motor 3 is increased from the still state and reaches a constant speed. The pulse period T of the sensor driving pulse generated during the image reading operation is constant, but its value is determined according as the brightness of the light source is changed with the environment and the life. The motor drive pulse period at the time of the constant speed is controlled to coincide with the sensor driving pulse period T by the CPU 10. The sensor output time, or data transfer time D per line during the high-speed reading operation is somewhat shorter than or equal to the sensor driving pulse period T as described above.

Since the sensor drive pulse period T in FIG. 1 is constant, the sensor output period D is always assured. Thus, the sensor output is not oversaturated, and part of data is not lost or erroneous, or all data can be read. In addition, since the motor drive pulse is not controlled to be synchronized in phase with the sensor driving pulse, it is not necessary that when the motor shifts from the smoothing state to the constant speed, the phase of the motor drive pulse be matched with that of the sensor driving pulse. Thus, the control for overload on the motor is also not necessary. According to this invention, the smoothing control on the motor which was not possible in realizing the high-speed reading can be performed, and the image data read by the image sensor 7 can be always taken out.

In this embodiment, the image data is taken out in synchronism with the sensor driving pulse.

Figure 5:
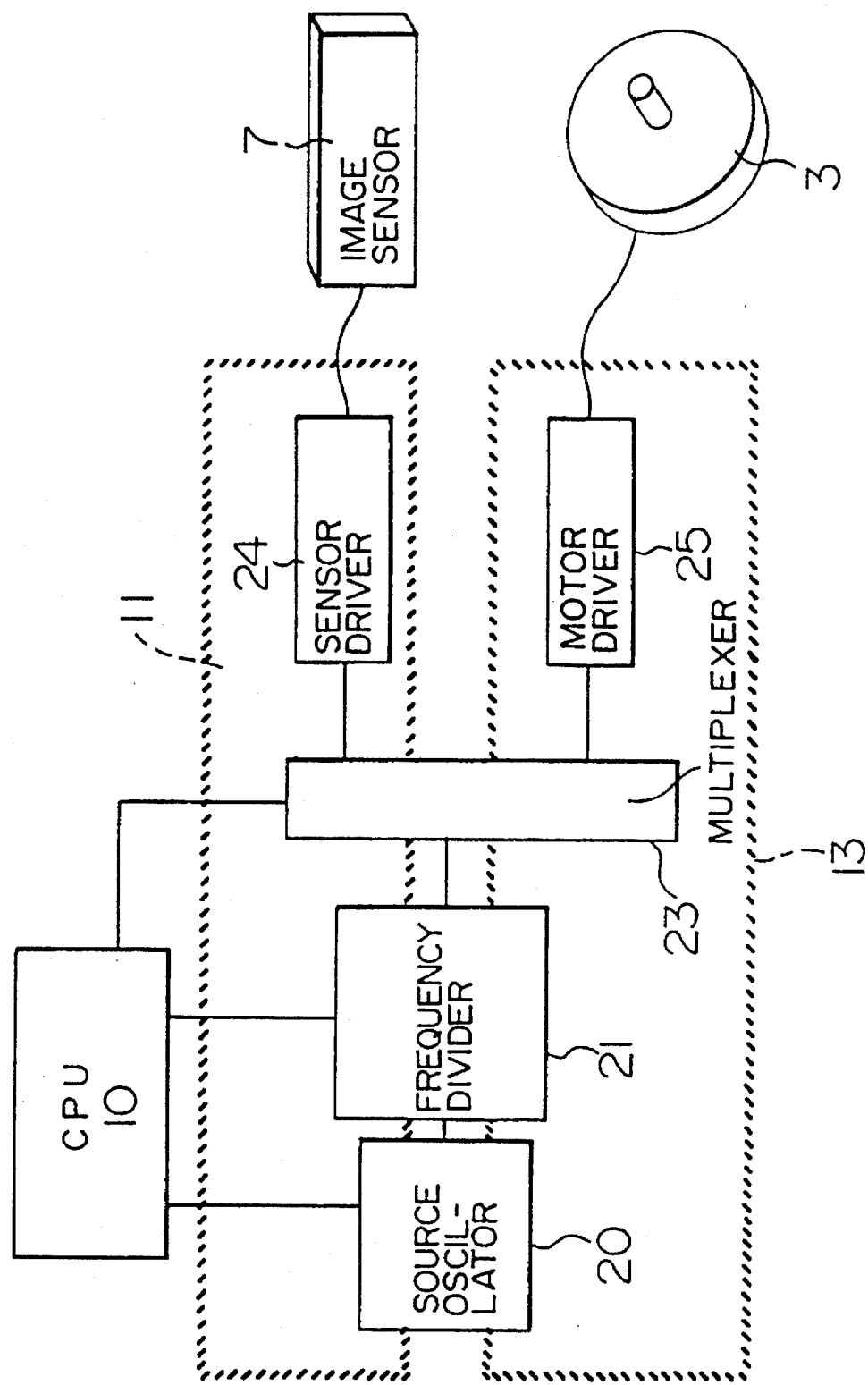
FIG. 5 is a block diagram of drive pulse generators in this invention.

FIG. 5 shows one example of the generators for the sensor driving pulse and the motor drive pulse.

A source oscillator 20 is shared by those generators. The output of the source oscillator 20 is connected to the input of a frequency divider 21, and the output of the frequency divider 21 is connected to the input of a multiplexer 23, where necessary frequencies are selected. These elements are controlled by the CPU 10. The sensor driving pulse selected by the multiplexer 23 is supplied to a sensor driver 24, and the motor drive pulse to a motor driver 25, so that those pulses are properly shaped in their waveforms. The waveform-shaped sensor driving pulse and motor drive pulse drive the image sensor 7 and the step motor 3, respectively. Since the source oscillator 20 is used common to those generators, the frequencies of the sensor driving pulse and motor drive pulse (the periods of the pulses at the time of constant speed) are matched with each other, and thus the image data can be stably received (the phases of the sensor driving pulse and motor drive pulse are different).

Figure 6:
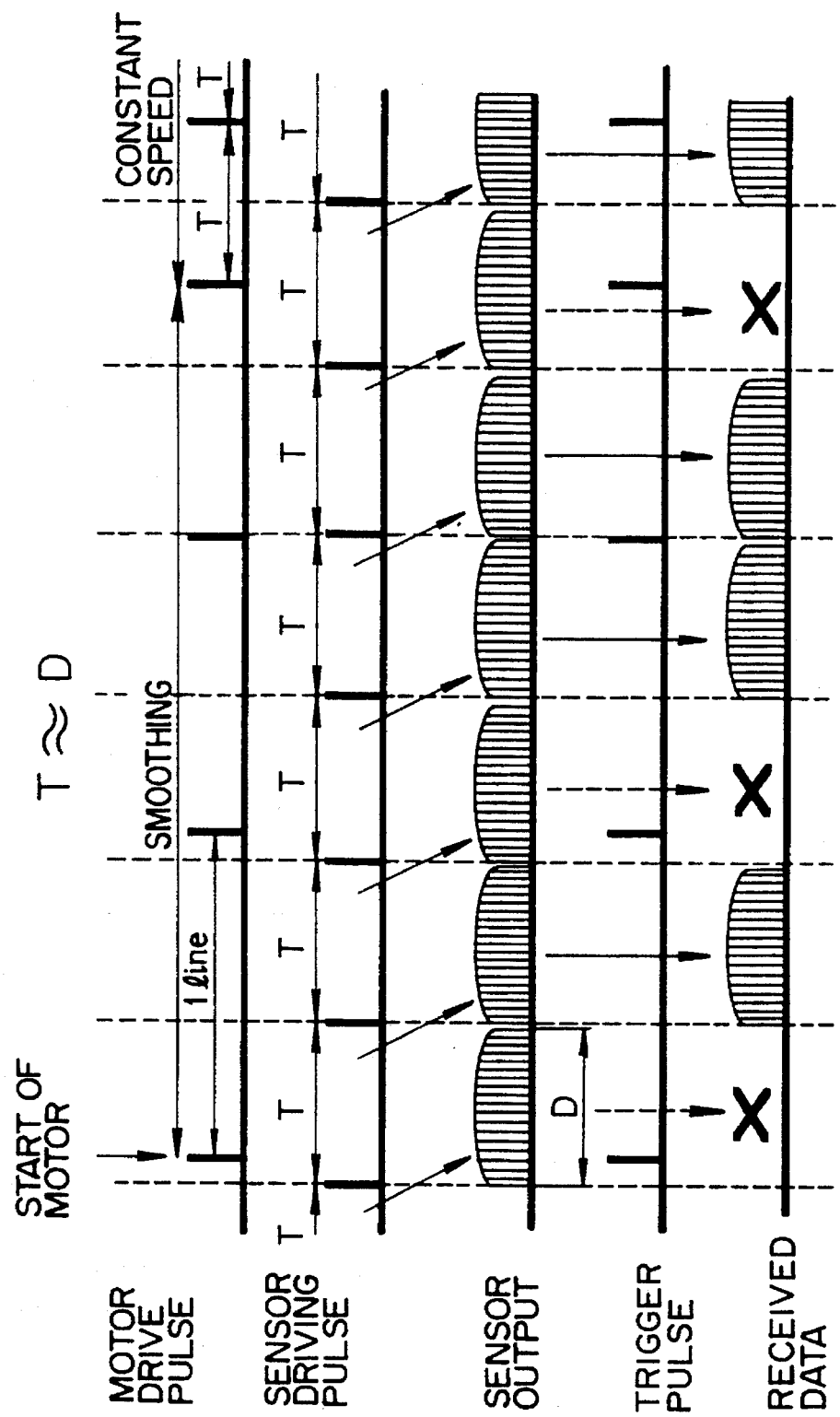
FIG. 6 is a timing chart for an example using an image read pulse.
Figure 7:
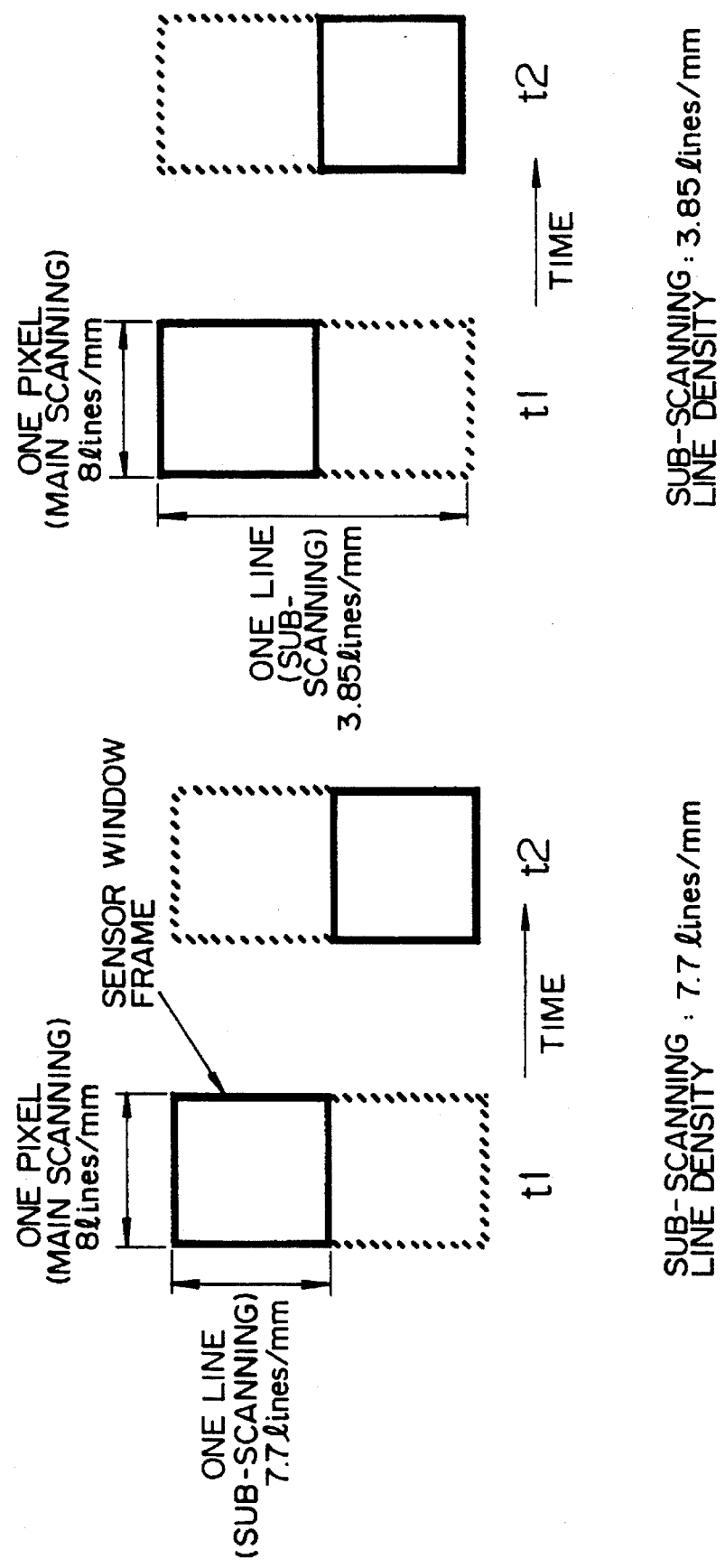
FIG. 7 is a diagram for explaining that the range of reading by the sensor is changed by the sub-scanning line density.

FIG. 6 is a timing chart for the read control sequence in another embodiment using a trigger pulse. Since a plurality of sensor driving pulses per line are generated when the motor starts, the image data is necessary to be selected and taken out according to the condition as shown in FIG. 7. FIG. 7 shows examples of the sub-scanning line density of the image sensor 7 of which the main scanning direction density is 8/mm. The sub-scanning direction density for facsimile is 3.85/mm or 7.7/mm. The sub-scanning direction indicates the movement direction of the manuscript, and the main scanning direction is perpendicular to the sub-scanning direction. When the sub-scanning direction density is 7.7/mm, the area to be read per line is substantially equal to that of the sensor window frame. When the sub-scanning direction density is 3.85/mm, the pixel area corresponding to about twice as large as the sensor window frame area must be read in the sub-scanning direction.

Figure 8:
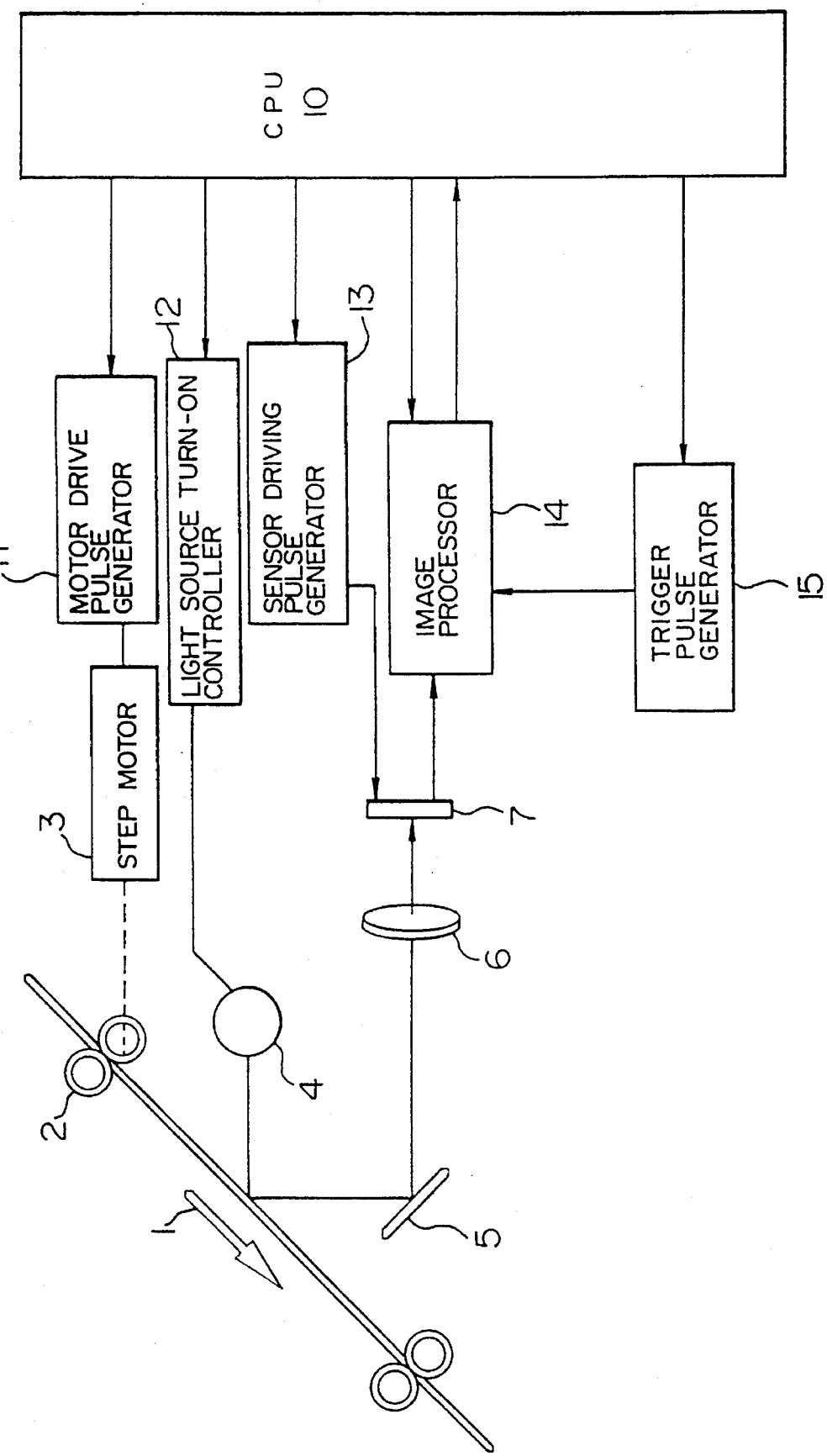
FIG. 8 is a block diagram of another embodiment of an image scanner of the invention.

Therefore, when the sub-scanning direction density is 7.7/mm, reading all information per line results in reading extra information, and thus it is better to read once per line while smoothing, as shown in FIG. 6. While both the motor drive pulse and the trigger pulse are shown in FIG. 6, the motor drive pulse is also actually used as the trigger pulse. During the smoothing period, and the first sensor driving pulse preceded by the motor drive pulse controls the timing to produce the image data, which is received by the trigger pulse. In the period in which the motor shifts from the smoothing state to the constant speed, the sensor driving pulse after the motor drive pulse, controls the timing to produce the image data by the sensor driving pulse. When the sub-scanning direction density is 3.85/mm, all the image data is taken out before the next trigger pulse comes. The taken-out data is processed to be integrated and averaged. FIG. 8 is a construction diagram of another embodiment of an image scanner of the invention using the trigger pulse for reading the image data. A trigger pulse generator 15 supplies its output to the image processor 14 under the control of the CPU 10.

Figure 9:
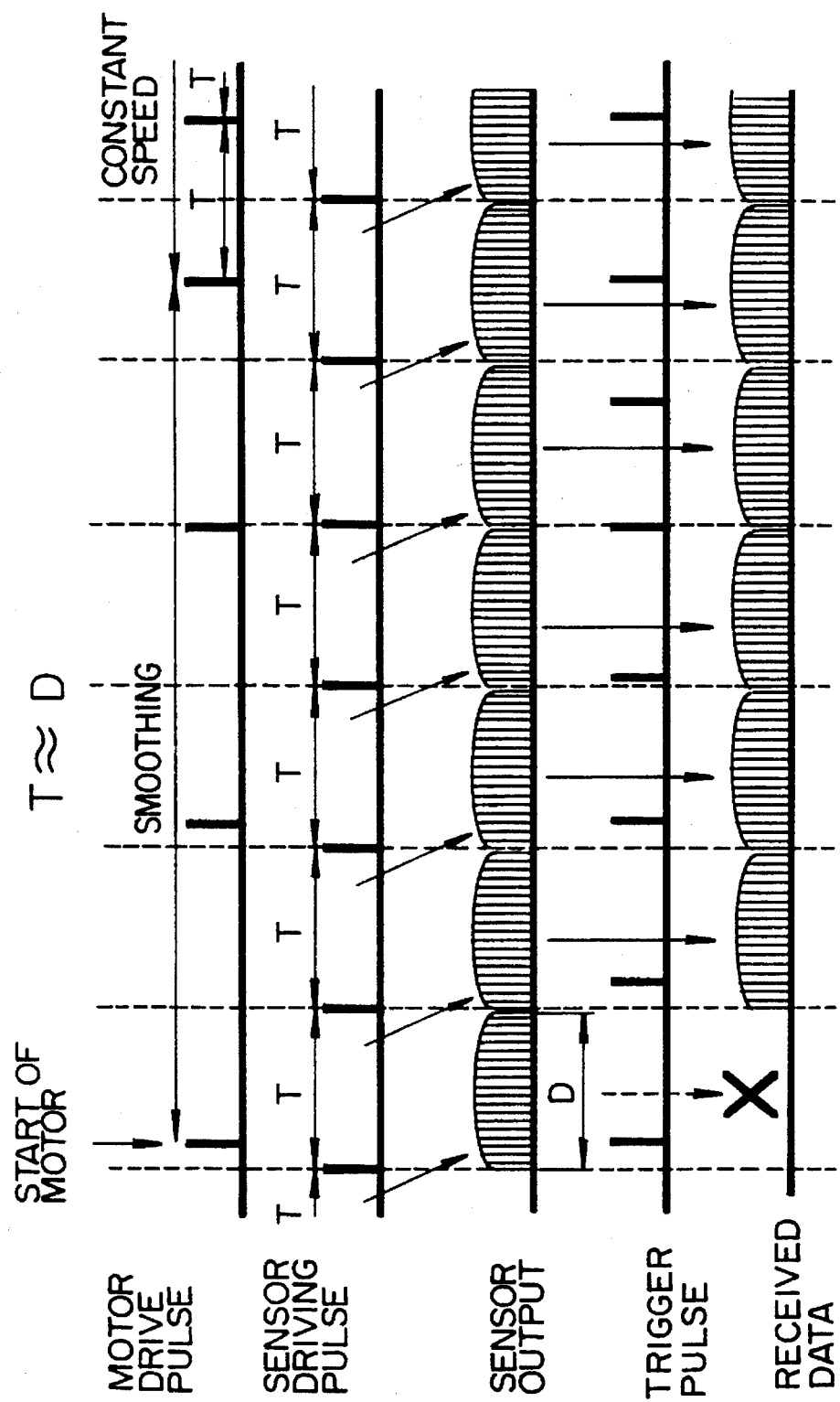
FIG. 9 is a timing chart for the above embodiment of the invention using a taking-out pulse.

FIG. 9 is a timing chart for the operation of the embodiment of FIG. 8. The trigger pulse may be generated a plurality of times per line as in FIG. 9. In FIG. 9, the trigger pulse is generated twice per line during the smoothing period. Since the smoothing characteristic of the motor is known, necessary image data can be obtained.

If the trigger pulse is properly generated as described above, the image information without loss, or high-quality information can be read.

When the size of the manuscript to be read is limited as in the copying machine and book-system facsimile, the memory capacity necessary for reading can be assured in advance. Thus, if the trigger pulse is controlled to generate, starting the reading operation after the step motor 3 is shifted from the accelerated state to the constant speed, and to stop before the step motor 3 is decelerated, the image data can be more stably read.

Figure 10:
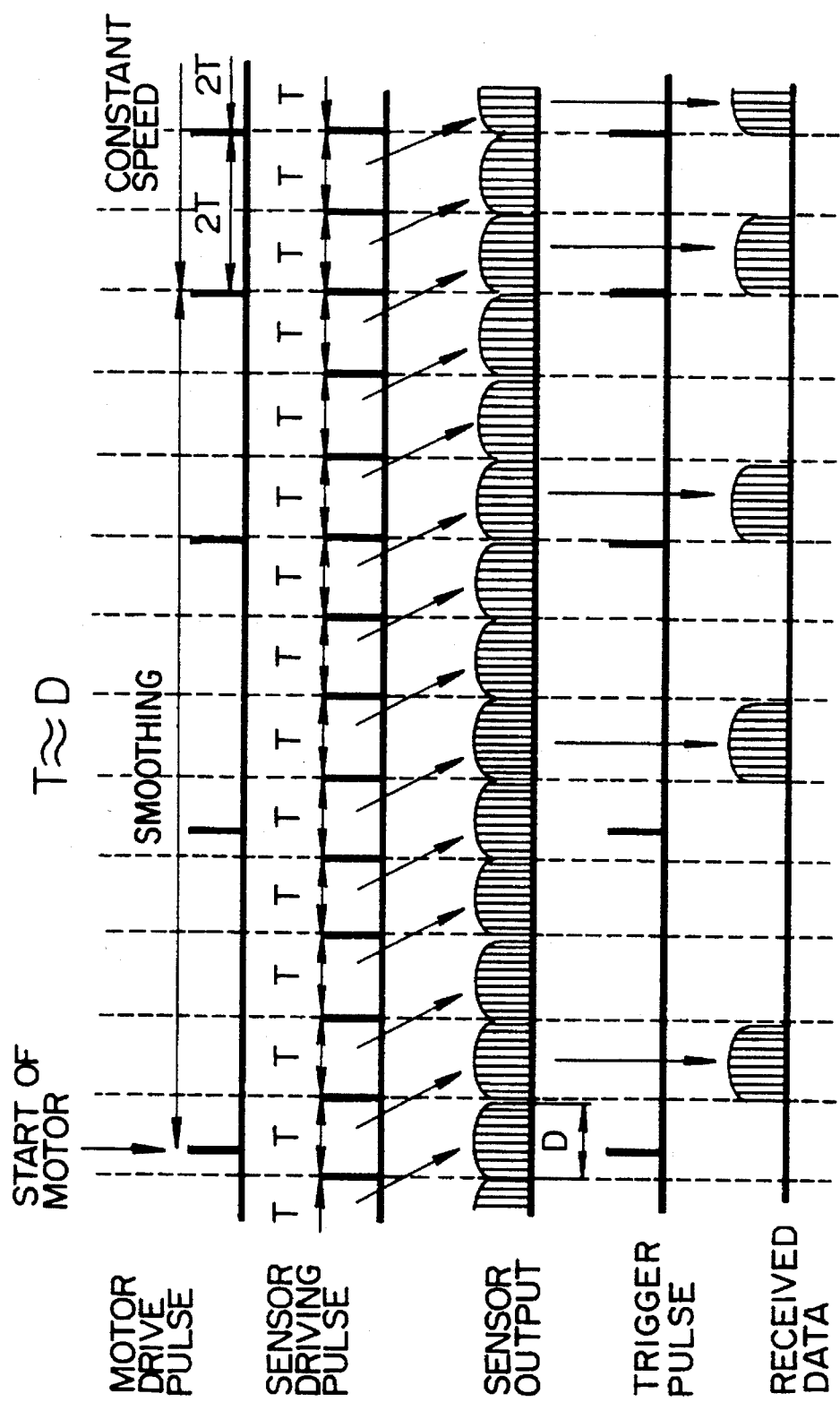
FIG. 10 is a timing chart for another read control sequence in this invention at the lower speed.
Figure 11:
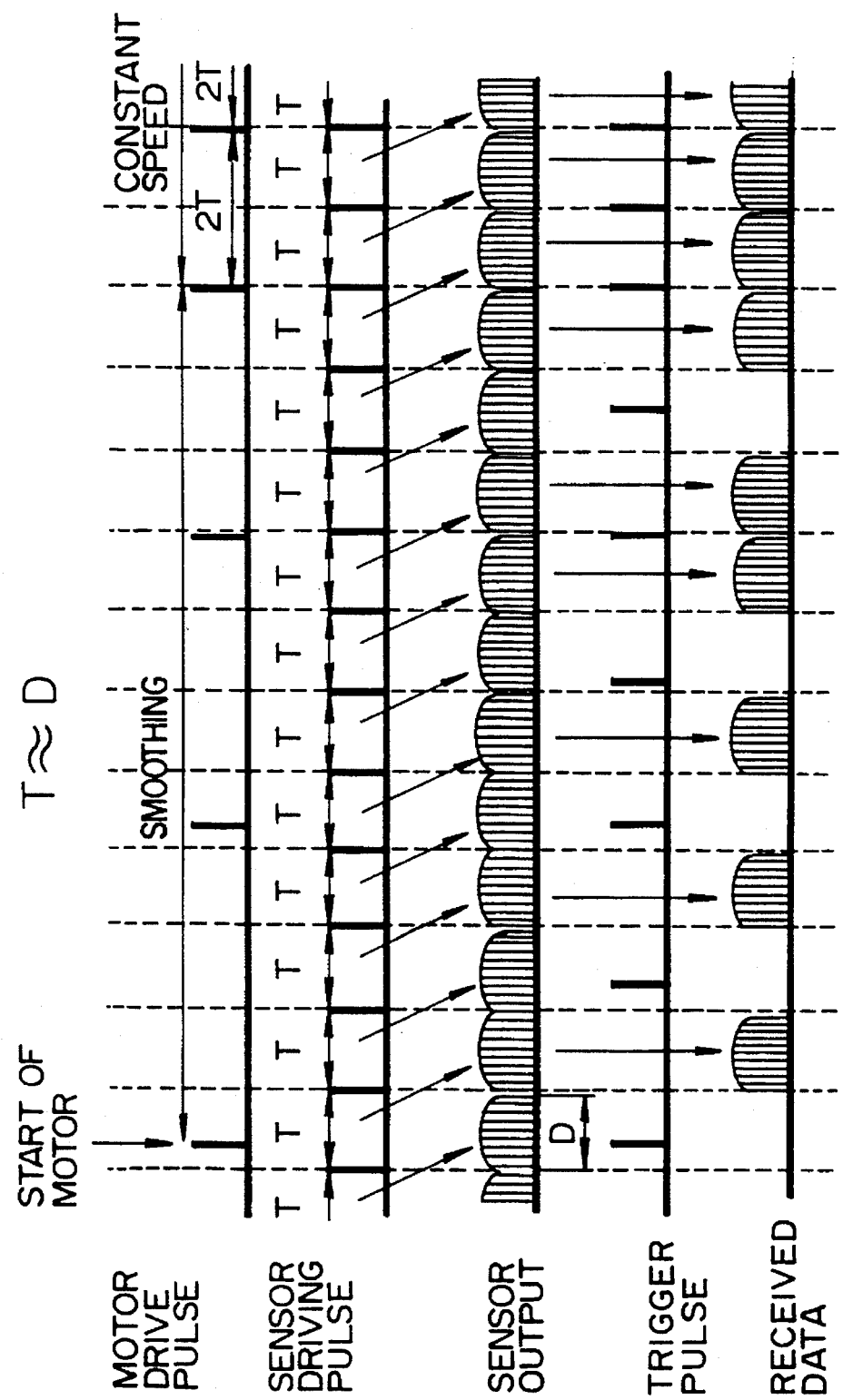
FIG. 11 is a timing chart for still another read control sequence in this invention at the lower speed.

The high-speed image scanner has been mentioned above in which the motor drive pulse period and the sensor driving pulse period per line are equal at the time of constant speed. This invention can also be used for a low-speed image scanner. In this case, when the motor reaches the constant speed, the motor drive pulse period is controlled to be an integer multiple of the sensor driving pulse period. FIG. 10 is a timing chart of another read control sequence in this invention. In this read control sequence, after the motor reaches the constant speed, two successive sensor driving pulses are generated for each motor drive pulse. When the sub-scanning direction density is 7.7/mm as shown in FIG. 7, the sensor window coincides with the area of one line, and thus the image data read by the sensor driving pulse occurring once per line can be taken out, or the trigger pulse may be generated once per line. When the sub-scanning direction density is 3.85/mm, the sensor driving pulse is generated twice for each motor drive pulse even at the time of constant speed, and thus the image data read by two sensor driving pulses are necessary to be taken out. Therefore, the trigger pulse may be generated twice for each motor drive pulse as shown in a timing chart of FIG. 11. Even when the image sensor 7 has a line density of as fine as 16/mm and is moved at a low speed upon reading, the number of trigger pulses for each motor drive pulse can be increased or decreased in accordance with the number of sensor driving pulses.

Thus, if the number of trigger pulses is changed according to the number of sensor driving pulses occurring during the period of the motor drive pulse, the image information can be prevented from being partially lost, and thus high-quality image data can be read.

Figure 12:
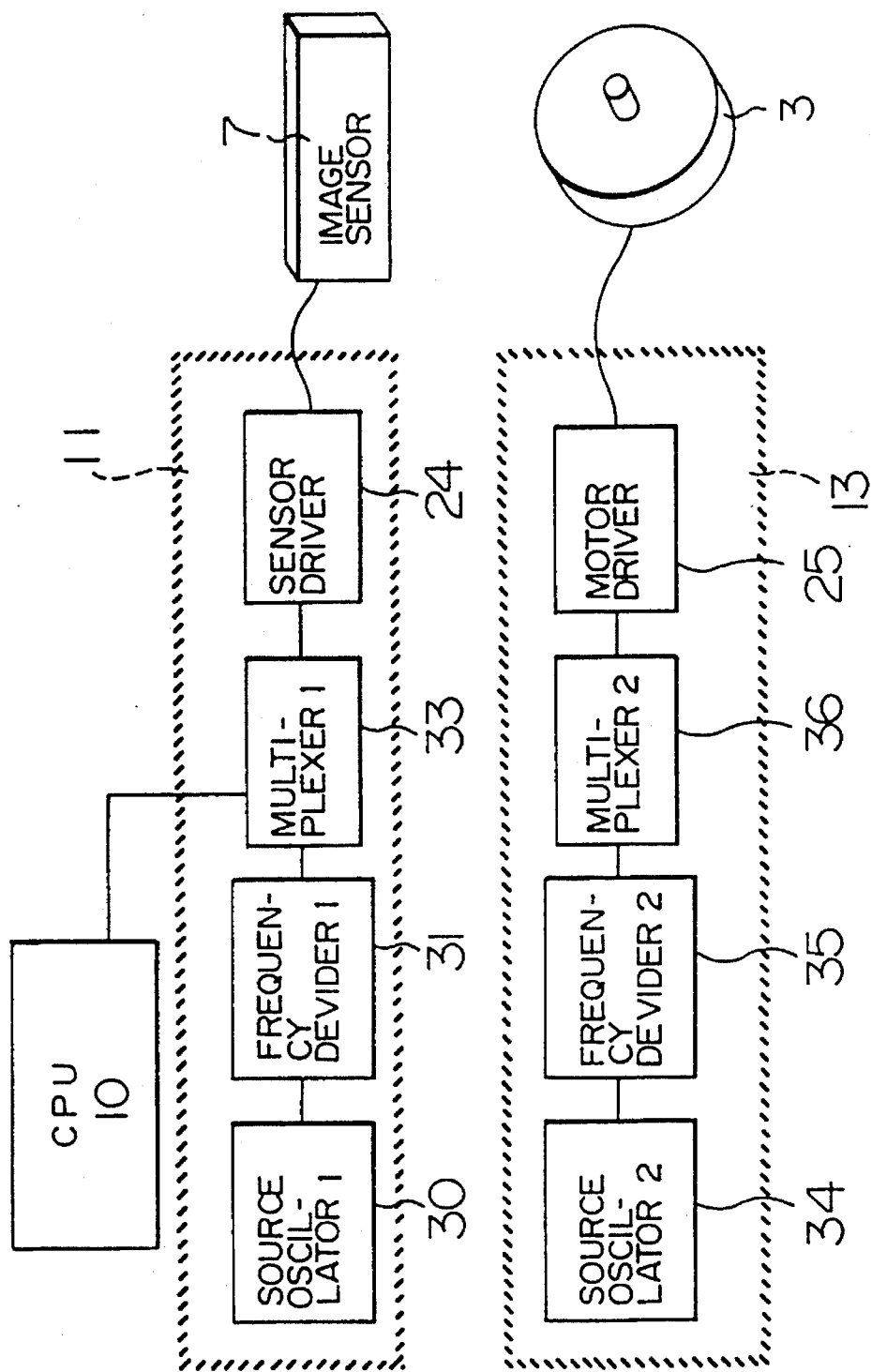
FIG. 12 is a block diagram of another example of the drive pulse generators.
Figure 13:
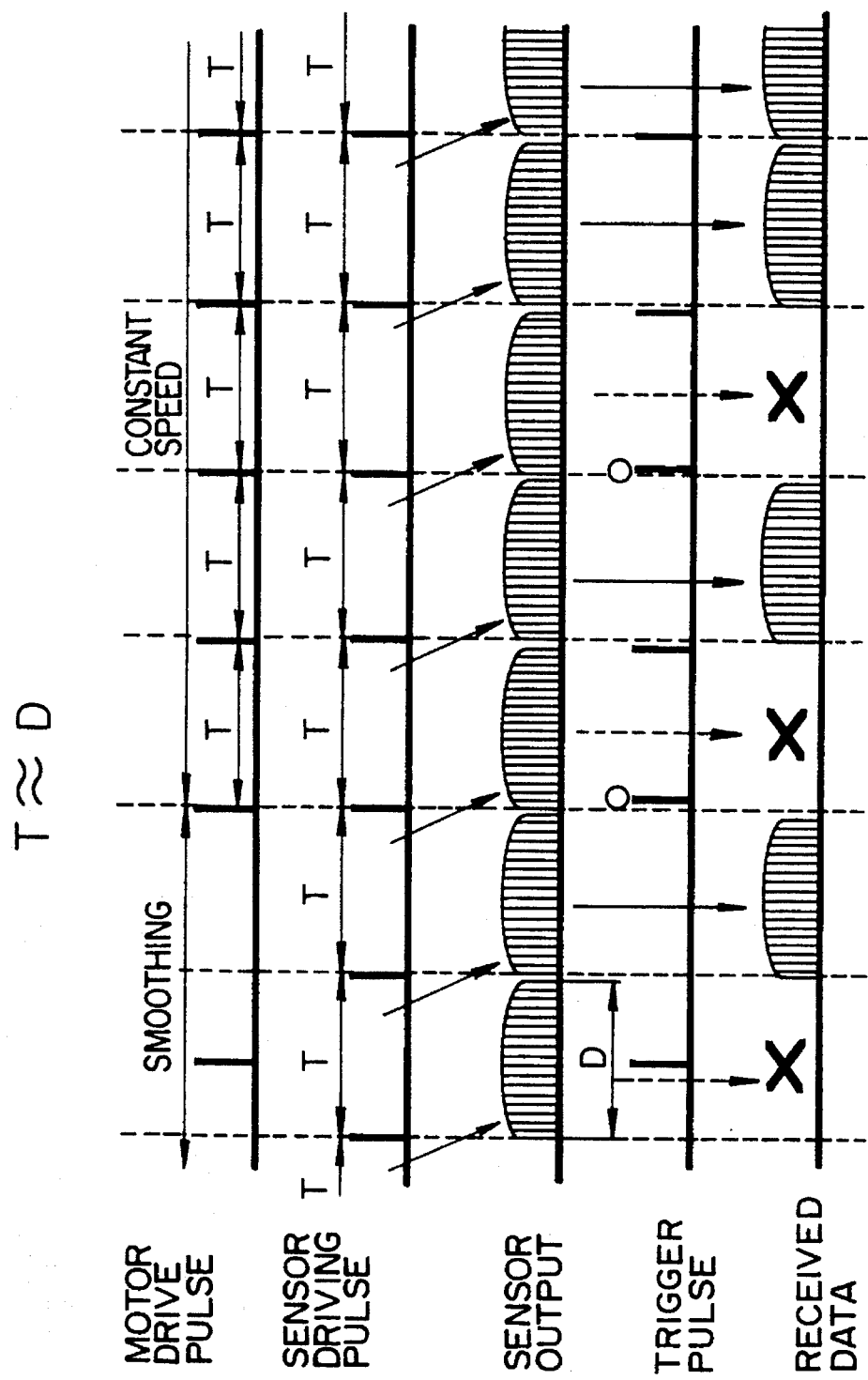
FIG. 13 is a timing chart to which reference is made in explaining the timing shift between the sensor driving pulse and the trigger pulse.

The source oscillator is used in common to the generators for the motor drive pulse and sensor driving pulse as shown in FIG. 5. However, in a certain facsimile apparatus or copying machine, two source oscillators are sometimes used as shown in FIG. 12. At this time, the period of the motor drive pulse is not completely coincident with that of the sensor driving pulse, and even at the constant speed, those pulses are sometimes out of timing. In this case, since the trigger pulse is normally generated on the basis of the source oscillator for the motor drive pulse, it is not matched in timing with the sensor driving pulse. FIG. 13 is a timing chart to which reference is made in explaining the image data is partially lost due to the mismatching of the timing between the trigger pulse and the sensor driving pulse. The trigger pulse indicated by a small circle in FIG. 13 misses the image data.

In addition, even when a common source oscillator is used, the motor drive pulse and the sensor driving pulse are sometimes coincident in phase when the motor has arrived at the constant speed because of the circuit arrangement of the motor drive pulse generator and sensor drive pulse generator. In this case, the trigger pulse may miss the image data.

Figure 14:
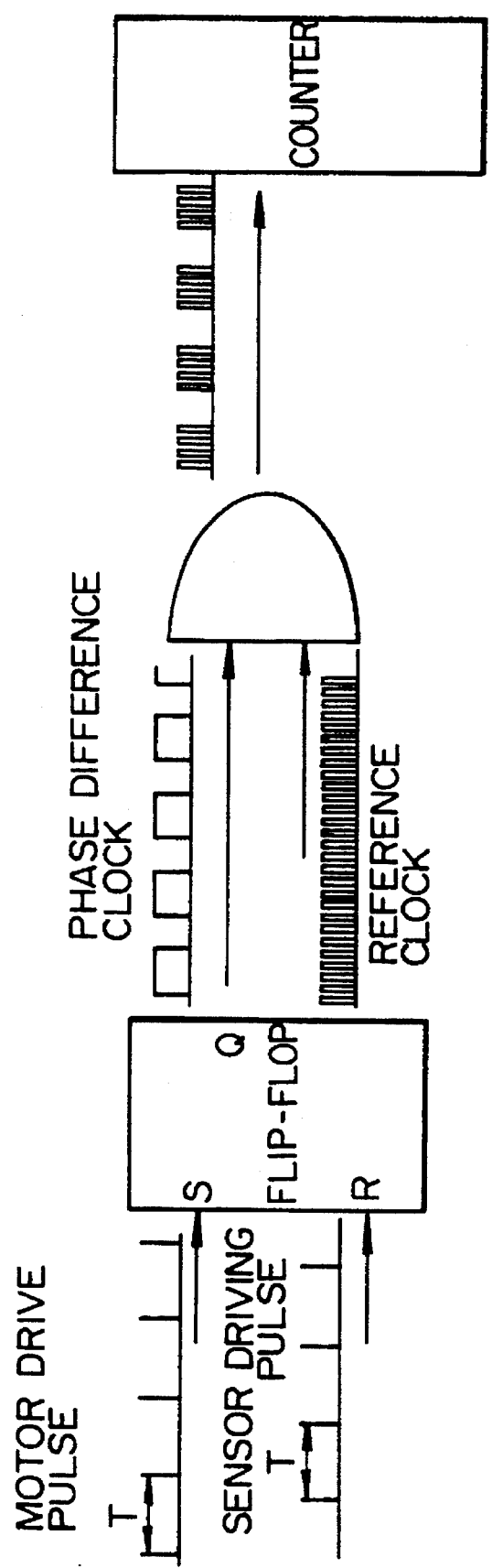
FIG. 14 is a block diagram of a phase difference detecting circuit in this invention.

FIG. 14 is a block diagram of a phase detecting circuit for the sensor driving pulse and motor drive pulse. When the sensor driving pulse and the motor drive pulse are supplied to a flip-flop, the flip-flop produces at its output a phase difference pulse of which the pulse width indicates the phase difference as shown in FIG. 14. This phase difference pulse and a reference clock are supplied to an AND circuit, and the logical product from the AND circuit is supplied to a counter, where the number of reference clock pulses is counted to indicate the phase difference. When the phase difference is smaller than a certain value, one of the two source oscillators is selected. For example, under the condition of $|\Phi_S-\Phi_M|\leq 0.1\Phi_S$ where $\Phi_S$ is the phase of the sensor driving pulse and $\Phi_M$ is the motor drive pulse, the image data is missed, and thus one source oscillator is switched to.

When the period of the motor drive pulse is not coincident with that of the sensor driving pulse due to the difference between the two source oscillators, or when the sensor driving pulse and the motor drive pulse have periods of, for example, 1 ms and 1.001 ms, respectively, the image data is missed at a rate of once for 1000 pulses. In this case, the phase detecting circuit shown in FIG. 14 can be used to predict the time at which the image data is missed because the phase difference pulse width is gradually decreased. If the trigger pulse is generated at this time, the image data can be prevented from being missed. For example, when $|\Phi_S-\Phi_M|\leq 0.1\Phi_S$, all the image data are taken out under the control of the CPU 10, so that the image data can be prevented from being missed.

Figure 15:
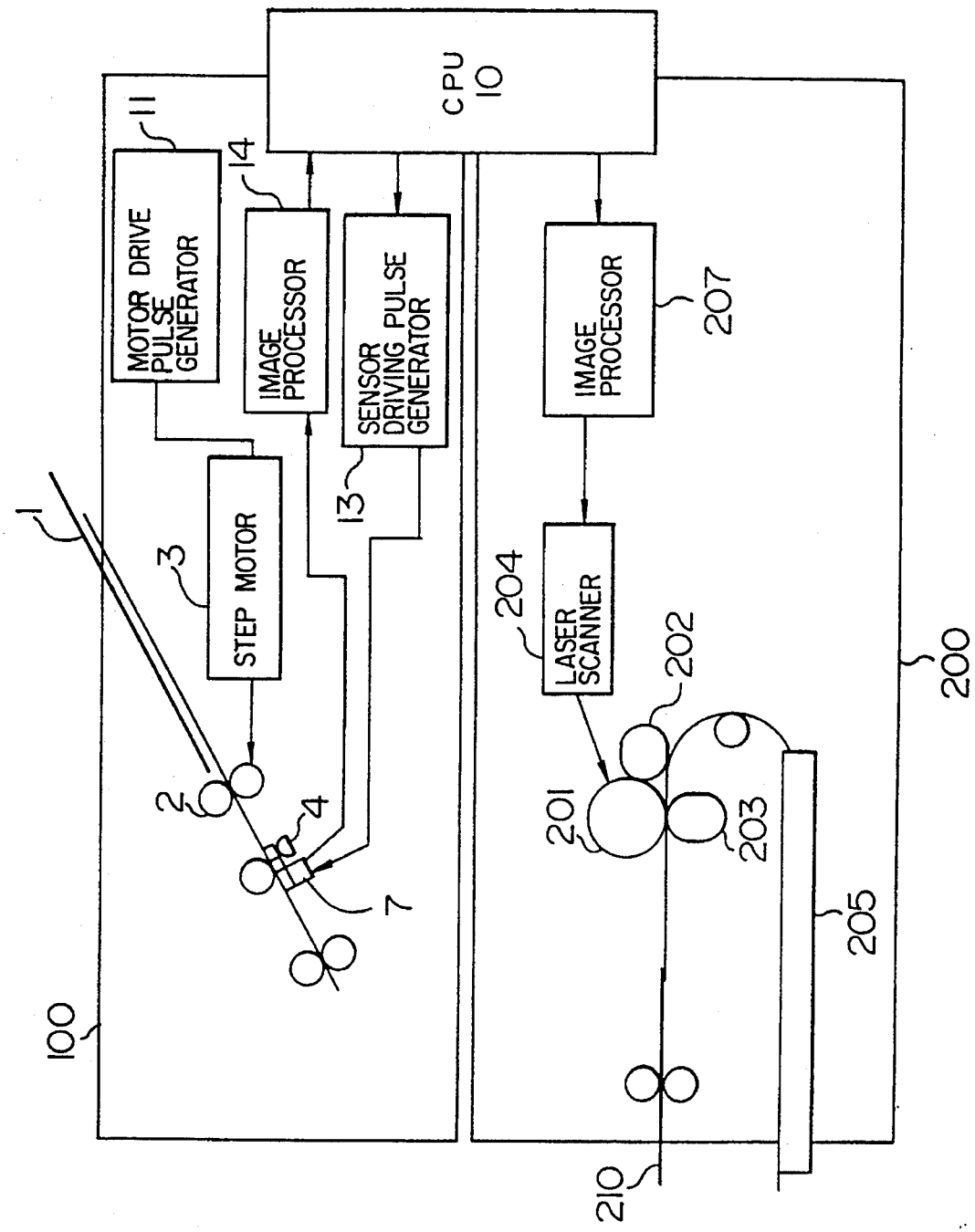
FIG. 15 is a block diagram of a copying machine to which this invention is applied.

FIG. 15 is a block diagram of a copying machine having the image scanner of the invention.

This embodiment has no communication apparatus 300 shown in FIG. 4. The image scanner is constructed so that the manuscript is moved by the manuscript carrying roller relative to the reading sensor. Of course, the manuscript may be fixed on the transparent glass plate while the sensor is moved to read the manuscript.

This embodiment is greatly different from the facsimile system in that the communication apparatus is not added. The other portions may have the same construction as the facsimile system.

Thus, the copying machine having the image scanner of the invention is able to make a high-speed copying operation as compared with the conventional copying machine, and to produce high-quality copies with no image deterioration.

According to this invention, when the step motor 3 is switched from the accelerated or decelerated state to the constant speed and enters in the constant speed condition, the image sensor 7 reads the range corresponding to one line and hence the image data with high quality and with no extension and compression can be taken out because the motor drive pulse and the sensor driving pulse have the same period even if they are different in timing. In addition, this image scanner can be manipulated with ease since it can read at a high speed.

What is claimed is:

1. An image scanning method for reading a manuscript image of a manuscript illuminated by a light source so that said manuscript image can be read with a certain sensor reading period per line by use of an image sensor while a drive motor is being controlled by a motor drive pulse to move said manuscript relative to said image sensor at each line, wherein said sensor reading period with which said manuscript image sensor reads said image is substantially constant and said manuscript image is read even when a relative speed of said manuscript to said image sensor is being changed:

wherein a sensor driving pulse frequency of a sensor driving pulse for driving said image sensor and a motor drive pulse frequency of said motor drive pulse for driving said motor are produced by a same oscillator;

wherein said sensor driving pulse frequency and said motor drive pulse frequency are made different from one another; and wherein one of said sensor driving pulse and said motor drive pulse is used when a relation between a sensor driving pulse phase $\Phi_S$ and a motor drive pulse phase $\Phi_M$ is $|\Phi_S-\Phi_M|\leq 0.1\Phi_S$.

2. An image scanner comprising:

an image sensor;

a drive means for moving a manuscript relative to said image sensor;

a sensor driving pulse means for generating a sensor driving pulse for driving said image sensor to read at each line an image of a manuscript illuminated by a light source;

an image processor for receiving and processing image data from said image sensor;

a motor drive pulse means for generating a motor drive pulse for driving at each line said drive means for moving said manuscript relative to said image sensor; and a controller which generates a control signal for providing control so that an exposure time of said image sensor substantially equals an output period of said image sensor, and so that said image data from said image sensor is all supplied to said image processor when a relation between a sensor driving pulse phase $\Phi_S$ and a motor drive pulse phase $\Phi_M$, a frequency of said motor drive pulse being different from that of said sensor driving pulse, is expressed by $|\Phi_S-\Phi_M| \Phi_S$.

3. An image scanner according to claim 2, wherein a period of said sensor driving pulse is constant, a period of said motor drive pulse is selected to be an integer multiple of said period of said sensor driving pulse, and phases of said motor drive pulse and said sensor driving pulse at a time of a constant speed are controlled independently of each other.

4. An image scanner comprising:

an image sensor;

a drive means for moving said manuscript relative to said image sensor;

a sensor driving pulse means for generating a sensor driving pulse for driving said image sensor to read at each line an image of a manuscript illuminated by a light source;

an image processor for receiving and processing image dam from said image sensor of which an exposure time is substantially equal to a period of said sensor output;

a motor drive pulse means for generating a motor drive pulse for driving at each line said drive means for moving said manuscript relative to said image sensor; and a trigger pulse generating means for generating a trigger pulse for controlling said image data to be taken out from said image sensor and fed to said image processor, and said trigger pulse is selected to be at least one said sensor driving pulse of sensor driving pulses generated during a period of said motor drive pulse.

5. An image scanner according to claim 4, wherein said motor drive pulse means is also used as said trigger pulse generating means so that said motor drive pulse can be used as said trigger pulse.

6. An image scanner according to claim 4, wherein said trigger pulse is generated when said motor is being driven at a constant speed.

7. An image scanning method for reading a manuscript image of a manuscript illuminated by a light source so that said manuscript image can be read with a certain sensor reading period per line by use of an image sensor while a drive motor is being controlled by a motor drive pulse to move said manuscript relative to said image sensor at each line, wherein said sensor reading period with which said image sensor reads said manuscript image is substantially constant and said manuscript image is read even when a relative speed of said manuscript to said image sensor is being changed, wherein said image sensor is controlled by a read pulse, and even when said drive motor increases its rotation speed, said read pulse of substantially a constant period is applied to said image sensor, for controlling said image sensor to read said manuscript image of said manuscript, wherein a read pulse period of said read pulse is substantially constant, and said motor drive pulse is changed in period when said motor is accelerated, and is made equal to, but different in phase from, said read pulse when said motor is rotated at a constant speed.

8. A copying machine comprising:

an image scanner for reading an image of a manuscript to produce a read image;

a recorder for recording said read image; and a controller for controlling said image scanner and said recorder, wherein said image scanner comprises a sensor driving pulse generating means by which a sensor driving pulse to drive said image sensor for reading said manuscript is controlled to generate said read image substantially at intervals of a constant period, and a motor drive pulse generating means for generating a motor drive pulse for driving a motor by which one of said manuscript and said image sensor is moved line by line, and said controller generates a command signal for controlling said motor drive pulse to be substantially equal in period to, but different in phase from, said sensor driving pulse at a time of a constant-speed operation.

* * * * *